Patented Aug. 9, 1932

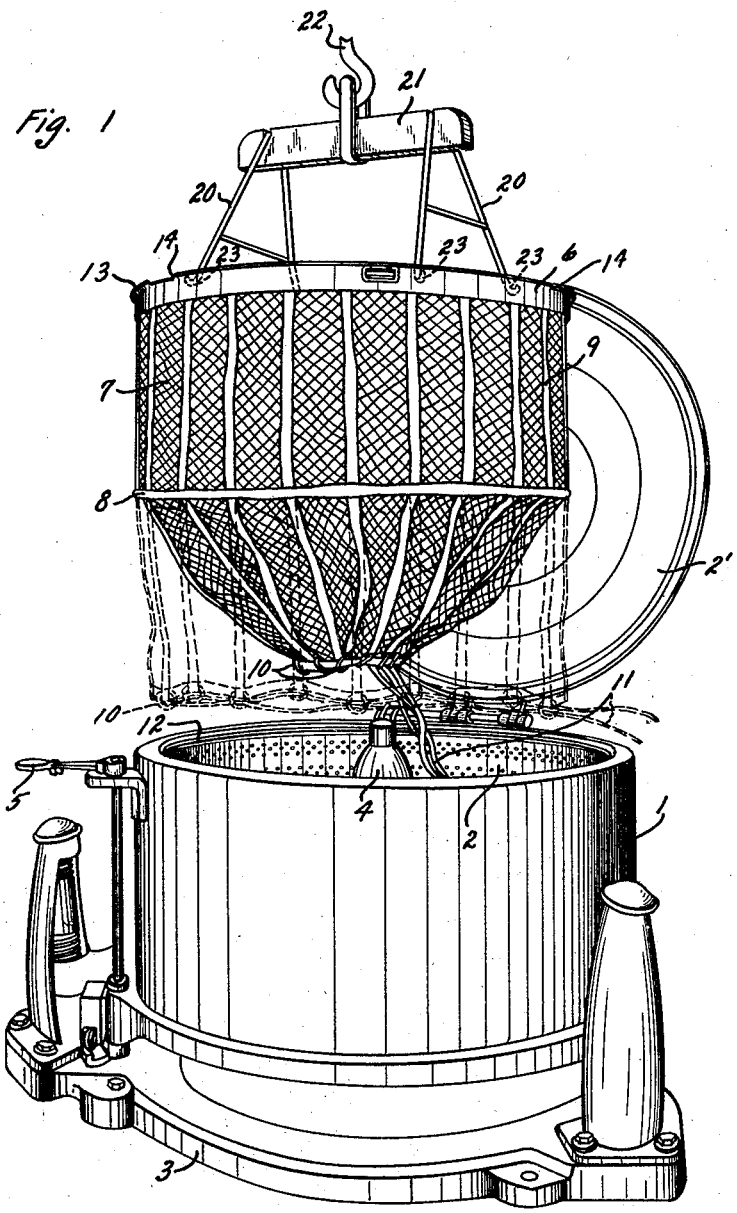

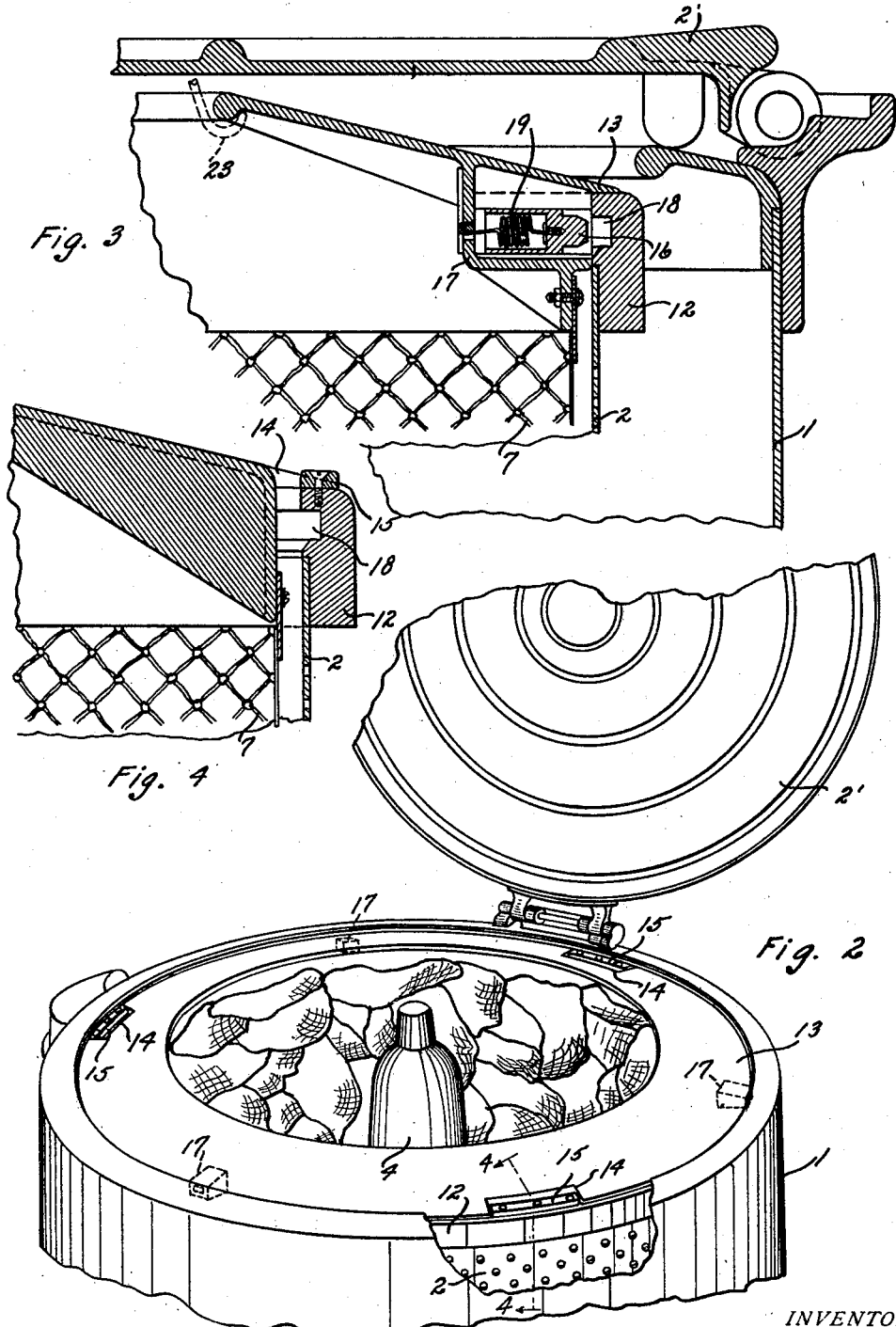

1,871,402

UNITED STATES PATENT OFFICE

FRED BALZER, OF CINCINNATI, OHIO, ASSIGNOR TO THE AMERICAN LAUNDRY MACHINERY COMPANY, OF CINCINNATI, OHIO, A CORPORATION OF OHIO

UNLOADING NET FOR EXTRACTORS

Application filed June 7, 1930. Serial No. 459,773.

My invention relates to an unloading net for extractors, and particularly, to a net adapted to receive the material to be extracted and which also serves as a vehicle by which the extracted work may be removed from the extractor.

Heretofore, one of the most difficult tasks in laundry operation has been the removal of goods from an extractor, due to the fact that the centrifugal force acting upon the wet material packs it so tightly against the sides of the extractor basket. Further, garments frequently become entangled during the extracting operation and are subsequently torn in being removed.

One object of my invention is to provide a net shaped to conform with an extractor basket and so designed that it may be lowered into the basket and securely held therein or may be easily removed therefrom, whereby the material may be removed from the extractor basket as a whole.

Another object of my invention is to provide an unloading net of such nature that when it is removed from the basket after the extracting operation, the normal tendency of its walls to collapse will break up the tightly packed material and insure easy removal thereof from the net.

Still another object of my invention is to provide latching means which operates automatically to secure the net in the proper position when the basket is rotated during the extracting operation and which automatically releases when rotation of the basket ceases after the extracting operation is finished.

Various other objects and advantageous features of my invention will be seen in the following description and one embodiment thereof may be seen in the accompanying drawings wherein similar characters of reference designate corresponding parts, and wherein:

Fig. 1 is a perspective view of an extractor with its cover in open position and showing an unloading net constructed in accordance with my invention in a position to be placed within the basket of the extractor.

Fig. 2 is a perspective view showing an extractor with a net therein and filled with material to be subjected to the extracting operation.

Fig. 3 is a sectional view showing the automatically operating latching means and the manner of engaging the unloading net to remove it from the extractor.

Fig. 4 is a sectional view taken on the line 4—4 of Fig. 2.

Referring to the drawings and particularly Fig. 1 thereof, I have shown an extractor that may be of any suitable type and embodies a curb 1, a basket 2 of foraminous material disposed within and rotatable with relation to the curb and its hinged cover 2'. The curb 1 is suitably supported on a frame 3 and embodies center bearings and a center bearing cover 4 and a brake means operable by a lever mechanism 5 for stopping rotation of the basket 2, as is usual. The construction of an extractor is well known in the art and further description thereof is unnecessary.

In accordance with my invention, the net embodies a circular metallic top ring 6 and a substantially circular bag 7 constructed of coarsely woven material suspended from the top ring. The net or bag 7 is somewhat greater in length than the depth of the extractor basket and is provided with a tape 8 extending around it at a distance from the top ring comparing somewhat nearly with the depth of the extractor basket.

As shown in Fig. 1, vertically extending tapes 9 are attached to the ring 6 and depend downwardly therefrom, these tapes being provided to act as a bracing means and increase the strength of the bag 7. Small rings 10 are attached to the lowermost ends of each of the tapes 9 and provide a means whereby a draw cord 11 may be threaded through such rings to draw together the lowermost edges of the bag into the position shown in Fig. 1 whereby material may be placed in the bag without falling through. In the event that the extractor embodies center bearings and a center bearing cover 4, the bottom of the bag 7 is partially closed to such an extent that it will pass freely over the center bearing cover. However, should there be no center bearing cover or center bearings in the extractor, the bottom of the bag would be completely closed.

The circular metallic top ring 6 is of such diameter as to fit snugly within the upper ring 12 of the extractor basket 2 and is provided with an outwardly extending flange 13 adapted to rest on the top of the ring 12 when the unloading net is in cooperative relation with the basket. As shown in Fig. 2, the flange 13 is provided with circumferentially spaced cutaway portions 14 adapted to fit over and cooperate with blocks 15 circumferentially spaced on the ring 12 to prevent relative rotation between the extractor basket 2 and the bag 7 of the unloading net and to bring the unloading net into the proper registering position with the extractor basket.

Means is also provided for securely locking the unloading net in position in the basket 2, consisting of latches 16 disposed in circumferentially spaced latch housings 17 on the unloading net ring and adapted to cooperate with a groove 18 extending circumferentially around the ring 12. Each latch 16 is normally held in retracted position by means of a coiled tension spring 19 which is sufficiently strong to hold the latch in retracted position when the basket and net are at rest but which yields to permit outward movement of the latch into locking position when the basket and net are rotated. Thus, I have provided a locking means that is automatically operated by rotation of the basket and net or, in other words, by the centrifugal action of the extractor.

Any suitable means for engaging the net may be employed as also any suitable lifting or conveying means. In this instance, I have shown two A-shaped members 20 adapted to fit over a cross bar 21 to which a hook 22 of a suitable lifting means may be attached. The hook members 23 on the lower ends of member 20 are adapted to engage the circular metallic top ring 6 in the manner best shown in Fig. 1. Thus, the net may be removed from the extractor.

In the operation of this device, the lower edges of the bag 7 are drawn together by means of the draw strings 11 in the manner shown in Fig. 1. Then, the bag 7 is lowered into the extractor and the articles to be subjected to the extracting operation are placed therein whereupon the extractor basket may be rotated in the usual manner.

Upon being lowered into the extractor, the cutaway portions 14 engage the blocks 15 in the manner hereinbefore described to prevent relative rotative movement between the net and the extractor basket and on beginning of the extracting operation by rotation of the extractor basket, the latch 16 will engage the groove 18 in the manner hereinbefore described, it being moved outwardly against the resistance of the spring 19, to securely lock the bag 7 against any relative movement with the extractor basket. However, as soon as rotation of the extractor basket ceases, the latch bolt 16 will be drawn out of the groove 18 by the action of the spring 19 whereupon the bag 7 may be lifted out of the extractor basket 2.

After the extraction operation has been completed and the latch 16 no longer engages the groove 18 due to centrifugal force, the bag 7 is lifted out of the extractor basket 2 whereupon the weight of the material in the bag tends to draw the sides of the bag inwardly and break up the masses of material. At this time, the bag with the material therein may be conveyed to the desired point and the draw strings 11 loosened whereupon the lower edge of the bag assumes the dotted line position shown in Fig. 1 and the material will drop therefrom.

Referring to the drawings and the preceding description, it will be seen that I have provided a device embodying numerous novel and advantageous features. For instance, I have provided a device making it possible to subject material to an extracting operation and then remove the material as a whole from the extractor. This is highly advantageous in that it prevents possible injury to the clothes resulting from removing them by hand, one piece at a time, from the extractor basket. It is also highly advantageous in that it is conducive to a great saving of time.

Another novel feature of this invention resides in the provision of a means for removing the material from an extractor as a whole and the provision of a centrifugally operating latching means for preventing relative movement between the removing means and the extractor during the extracting operation. Numerous other advantageous features will be readily apparent.

What I claim is:

1. In combination with an extractor embodying a basket, a bag constructed of coarsely woven material adapted to fit within the extractor basket, and means for preventing movement between said bag and said basket, said means comprising a latch automatically operable by the rotation of said basket.

2. In combination with an extractor embodying a basket, a bag having a supporting ring and constructed of coarsely woven material adapted to fit within the extractor basket, and means for preventing movement between said bag and said basket, said means comprising cooperating cutaway positions in the bag supporting ring and blocks on the upper edge of the extractor basket and a latch automatically operable by the rotation of said basket.

3. In combination with an extractor embodying a basket, a bag constructed of flexible material and adapted to fit within an extractor basket, and means for preventing movement between said bag and said basket, said last named means comprising a latch carried by said bag and adapted to be thrown outwardly by rotation of said bag and basket into cooperative relation with a groove on said basket.

4. In combination with an extractor embodying a basket, a bag constructed of flexible material and adapted to fit within an extractor basket, and means for preventing movement between said bag and said basket, said last named means comprising a latch carried by said bag and adapted to be thrown outwardly by rotation of said bag and basket into cooperative relation with a groove on said basket, and means for retracting said latch to normal inoperative position on stopping rotation of said bag and basket.

5. In combination with an extractor embodying a basket, a bag constructed of flexible material and adapted to fit within an extractor basket, and means responsive to the speed of rotation of the bag and basket for locking the bag in place.

In testimony whereof I hereby affix my signature.

FRED BALZER.